US012279570B2

(12) United States Patent
Rollwa et al.

(10) Patent No.: US 12,279,570 B2
(45) Date of Patent: Apr. 22, 2025

(54) GREENHOUSE ARRANGEMENT

(71) Applicant: Jungheinrich Aktiengesellschaft, Hamburg (DE)

(72) Inventors: Volker Rollwa, Pirmasens (DE); Jörg Cavelius, Bad Vilbel (DE); Markus Liebhaber, Oberursel (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 71 days.

(21) Appl. No.: 17/306,579

(22) Filed: May 3, 2021

(65) Prior Publication Data
US 2021/0337745 A1 Nov. 4, 2021

(30) Foreign Application Priority Data

May 4, 2020 (EP) .................................... 20172793

(51) Int. Cl.
*A01G 9/26* (2006.01)
*A01G 9/14* (2006.01)
*A01G 9/24* (2006.01)

(52) U.S. Cl.
CPC ............... *A01G 9/26* (2013.01); *A01G 9/143* (2013.01); *A01G 9/247* (2013.01); *A01G 9/249* (2019.05)

(58) Field of Classification Search
CPC ........ A01G 9/143; A01G 9/088; A01G 9/249; A01G 9/26; B65G 1/0471
See application file for complete search history.

(56) References Cited

U.S. PATENT DOCUMENTS

| | | |
|---|---|---|
| 3,314,192 A | 4/1967 | Barratt |
| 2012/0060416 A1 | 3/2012 | Brusaore |
| 2014/0017043 A1* | 1/2014 | Hirai ...................... A01G 27/00 414/267 |
| 2014/0366443 A1* | 12/2014 | Brusatore ................ A01G 9/02 47/65.5 |
| 2019/0092567 A1* | 3/2019 | Lawrence ................ B65G 1/12 |
| 2019/0246571 A1 | 8/2019 | Ingram-Tedd et al. |
| 2019/0263589 A1* | 8/2019 | Clarke .................. G06F 1/3203 |
| 2019/0281771 A1* | 9/2019 | Setton .................. B65G 1/0478 |
| 2019/0380283 A1 | 12/2019 | Chong |
| 2020/0236883 A1* | 7/2020 | Ambrosi ................ A01G 9/143 |
| 2020/0375120 A1* | 12/2020 | Kaneko ................ A01G 27/003 |
| 2021/0195858 A1* | 7/2021 | Girardin ................ A01G 9/247 |

(Continued)

FOREIGN PATENT DOCUMENTS

| | | | |
|---|---|---|---|
| CN | 201733693 | 2/2011 | |
| CN | 108668686 A | * 10/2018 | ............... A01G 7/00 |
| DE | 102016125788 A1 | * 6/2018 | |

(Continued)

OTHER PUBLICATIONS

Europe Search Report & Office Action conducted in counterpart Europe Appln. No. 20172793.0 (Aug. 3, 2020).

(Continued)

*Primary Examiner* — Peter M Poon
*Assistant Examiner* — Hae Rie Jessica Byun
(74) *Attorney, Agent, or Firm* — GREENBLUM & BERNSTEIN, P.L.C.

(57) ABSTRACT

A greenhouse arrangement that includes a block storage system in which at least one stack of multiple block storage elements can be accommodated.

16 Claims, 3 Drawing Sheets

(56) References Cited

U.S. PATENT DOCUMENTS

2022/0217919 A1\* 7/2022 Whelan .................. A01G 31/06

FOREIGN PATENT DOCUMENTS

| FR | 1103096 | 10/1955 | | |
|----|---------|---------|---|---|
| JP | 2013-81422 | 5/2013 | | |
| JP | 2018-516070 | 6/2018 | | |
| KR | 100850684 B1 \* | 8/2008 | ............ | A01G 31/00 |
| NL | 9300418 | 10/1994 | | |
| WO | WO-2013114500 A1 \* | 8/2013 | ............... | A01G 7/00 |
| WO | WO-2014181417 A1 \* | 11/2014 | ............... | A01G 9/143 |
| WO | 2018/122289 | 7/2018 | | |
| WO | 2019/195027 | 10/2019 | | |
| WO | WO-2020098890 A1 \* | 5/2020 | | |
| WO | WO-2021116115 A1 \* | 6/2021 | ............ | A01G 31/00 |

OTHER PUBLICATIONS

Japan Office Action (JP OA) conducted in counterpart Japan Appln. No. 2021-082698 (Jan. 21, 2025).

\* cited by examiner

GREENHOUSE ARRANGEMENT

CROSS-REFERENCE TO RELATED APPLICATIONS

The present application claims priority under 35 U.S.C. § 119 of European Patent Application No. 20172793.0, filed May 4, 2020, the disclosure of which is expressly incorporated by reference herein in its entirety.

BACKGROUND OF THE INVENTION

1. Field of the Invention

Embodiments are related to a greenhouse arrangement.

2. Discussion of Background Information

Known greenhouse arrangements comprise, for example, a film structure which is arranged across a planting region. So that all plants receive uniform light, greenhouse arrangements are generally arranged over fields. Glass structures are also used as an alternative to the film structure. In each case, the rays of sunlight must get through to the plants, whereby a certain transparency of the tarpaulin structure or glass structure is required. As an alternative to the aforementioned fields, the greenhouse arrangement can also span planting tables. For it to be possible to tend, water, and harvest the plants, pathways are created inside of the greenhouse arrangements, on which pathways no plants grow or plants grow only in some sections. For this reason, the floor plan of greenhouse arrangements of this type is normally sized very generously.

Another greenhouse arrangement is what is referred to as vertical farming. Here, plants are grown in racks which are arranged in halls. The rack arrangement results in multiple levels on which plants grow. Similarly to the greenhouse arrangement described above, pathways for tending, watering, and harvesting must be provided between the racks in vertical farming. This results in a certain distance between the individual racks which must be adhered to at a minimum in order to have an adequate amount of free movement for tending, harvest, watering, or the like. Thus, there is room for a larger planting region on a floor plan of the same size as for the fields described above.

SUMMARY OF THE INVENTION

Embodiments effectively utilize the available space with a greenhouse arrangement. In particular, embodiments are directed to a greenhouse arrangement.

The greenhouse arrangement comprises a block storage system in which at least one stack of multiple block storage elements can be accommodated. A block storage system is characterized in that it has a very high packing density. Depending on the embodiment, the block storage system can be loaded with stackable block storage elements either from above or from below. Plants in all stages of growth can be arranged in the block storage elements. Because the block storage elements are stackable, a very high space yield can be achieved in a block storage system of this type. Furthermore, the block storage system can be shielded against environment influences so that optimal growth conditions for plants can be produced. The greenhouse arrangement configured in such a manner is therefore designed to be compact.

Preferably, the greenhouse arrangement comprises at least one block storage element receiving space that comprises at least one supply apparatus and/or at least one data transmission device. Through the supply apparatus, the plants can be adequately supplied with light, fluid, nutrient solutions, an appropriate atmosphere, or the like in accordance with their needs. With the data transmission device, data from sensors, valves, switches, or the like can be transmitted, for example. The data can thereby help to optimize plant growth using the supply apparatus.

Preferably, a loading space is arranged below the block storage element receiving space. With this arrangement, the block storage element receiving space can be loaded from below, whereby the stack of block storage elements increases from the bottom up with each new block storage element. In addition, the stack is dismantled again through the loading space; that is, one bottommost block storage element each is removed in a downwards direction. Gravity moves the block storage elements that form a stack downwards. If only one block storage element is arranged in the block storage element receiving space, this block storage element is located in a bottommost position of the block storage element receiving space. Through this arrangement, empty operation is avoided since as long as a block storage element is arranged in a block storage element receiving space, a block storage element is located in a removal position adjacent to the loading space.

Preferably, the block storage element comprises a lighting apparatus. The lighting apparatus can be arranged on a bottom side of the block storage element so that the lighting apparatus shines or irradiates in a direction of gravity. In addition to an illumination function, the lighting apparatus can also perform warming functions, so that an object being stored, such as plants or light-sensitive objects for example, which is arranged in a block storage element arranged below the block storage element, can be illuminated and/or heated.

Preferably, the supply apparatus and/or data transmission device are arranged along an intake and/or removal direction. Thus, block storage elements with different heights can, for example, be arranged in the block storage element receiving space without there being a supply gap or data transmission gap.

Preferably, the block storage element receiving space comprises a bottommost block storage element receiving position and at least one block storage element receiving position arranged higher up in the direction of gravity, wherein starting from an uppermost block storage element receiving position, the supply apparatus and/or data transmission device end above the bottommost block storage element receiving position. Accordingly, the block storage element that is arranged in a bottommost block storage element receiving position is not supplied with energy. This is also unnecessary if the lighting apparatus can be arranged on the bottom side of the block storage element, whereby the lighting apparatus shines downwards, in the direction of gravity. Because no other block storage element is arranged below the bottommost block storage element, the supply of the bottommost block storage element and the lighting apparatus thereof is no longer required. Thus, with this arrangement it is ensured that only the block storage elements that are arranged above the bottommost block storage element are supplied with energy. As a result, the control expenditure for the block storage element in the bottommost block storage element receiving position is avoided. Furthermore, with this arrangement the material and assembly expenditure is reduced, as a result of which fewer costs are incurred.

Preferably, different supply apparatuses and/or data transfer devices are arranged at different corners of the block storage element receiving space. In this manner, malfunctions between the data transmission device and the energy transmission device can be prevented. In addition, different safety aspects can be adhered to with this arrangement.

Preferably, the supply apparatus comprises an energy transmission device. To allow plants that are arranged in block storage elements to be provided with light, for example, it is advantageous if a lighting apparatus is supplied with energy. In addition to the lighting apparatus, the energy device can be connected to other energy consumers such as sensors, for example.

Preferably, at least one block storage element arranged in the block storage element receiving space comprises at least one counterpart to the energy transmission device and/or data transmission device. With this device, energy can be transmitted from the block storage element receiving space to the block storage system in order to supply energy consumers. Possible energy consumers are, for example, sensors, lighting apparatuses, control arrangements, or the like.

The counterpart preferably comprises a compensating device. With the compensating device, inaccuracies in the positioning of the block storage element can be compensated. As a result, an interaction of the counterpart with the energy transmission device and/or data transmission device can be ensured.

Preferably, the counterpart comprises a clamping device. The clamping device presses at least part of the counterpart against the energy transmission device and/or data transmission device, whereby contact is established between the counterpart and the energy transmission device and/or the data transmission device. The clamping device furthermore helps to compensate irregularities in the energy transmission device and/or the data transmission device.

Preferably, the energy transmission device and/or data transmission device comprise a conductor rail and the counterpart comprises a sliding contact. Both the conductor rail and also the sliding contact are manufactured in large quantities, as a result of which the elements are cost-efficient, which minimizes the costs of the greenhouse arrangement. Furthermore, within the scope of a placement-into-storage and removal process, the surfaces of the conductor rail and sliding contacts are cleaned, polished, or the like, whereby a good transmission of energy or data is ensured.

Preferably, the counterpart comprises at least two sliding contacts arranged one after the other. With this arrangement, at least one sliding contact, and therefore the counterpart, interacts with the supply apparatus and/or data transmission device. In this manner, potential gaps within the supply apparatus and/or data transmission device can be bridged. An interaction of the supply apparatus and/or data transmission device with the counterpart is thus ensured.

Preferably, the supply apparatus comprises a fluid and/or nutrient supply device. The fluid and/or nutrient supply device can supply plants which are arranged in the block storage element with fluid and/or nutrients. The plants thus encounter optimal growth conditions, as a result of which plant growth can be promoted.

Preferably, the fluid and/or nutrient supply device comprises at least one valve and/or at least one storage tank and/or at least one pump and/or at least one feed and/or at least one outflow and/or at least one processing device. With this arrangement, plants arranged in the block storage element can be supplied with fluid and/or nutrients. The plants thus encounter optimal growth conditions, as a result of which a time to harvest is reduced. In addition, a regular removal of the block storage element from the block storage system is no longer required in order to supply the plants with fluid and/or nutrients outside of the block storage system. This reduces a tending expenditure and therefore costs.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A block storage system denotes a storage arrangement having at least one block storage element receiving space. Stackable block storage elements can be placed into and removed from storage in the block storage element receiving space. For this purpose, at least one block storage element is placed into or removed from storage in the block storage element receiving space through a loading space. The loading space can be arranged above or below the block storage element receiving space in the direction of gravity, so that a placement-into-storage direction or removal-from-storage direction is oriented in the direction of gravity or against the direction of gravity. The placement-into-storage and removal-from-storage direction is determined by the arrangement of the loading space. If the loading space is arranged above the block storage element receiving space, the placement-into-storage direction is in the direction of gravity and the removal-from-storage direction is against the direction of gravity. If the loading space is arranged below the block storage element receiving space in the direction of gravity, the placement-into-storage direction is oriented against the direction of gravity and the removal-from-storage direction is oriented in the direction of gravity. If multiple block storage elements are placed into storage in the block storage element receiving space, a block storage element stack is formed. Other terms for the block storage system are stacking storage system or container stacking storage system. In the present exemplary embodiment, the block storage element receiving space is arranged above the loading space in the direction of gravity.

Figure 1:
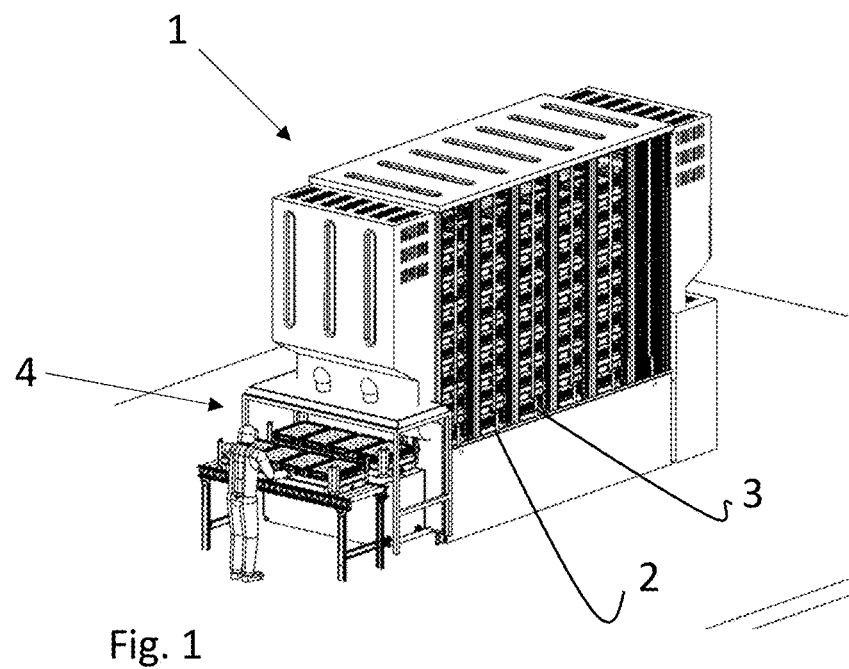
FIG. 1 shows a block storage system.

In FIG. 1, a block storage system 1 is illustrated. The block storage system 1 comprises multiple block storage element receiving spaces 2. Multiple block storage elements 3 can be arranged in a stackable and removable manner in the block element receiving spaces 2. The block storage elements 3 are transferred into the block storage system 1 through a placement-into-storage and removal region 4, and are also removed again therefrom. In the present embodiment, the placement-into-storage and removal region 4 is connected to the loading space by a port, which is not illustrated. The port is in turn connected to a loading space, not illustrated, which is arranged below at least one block storage element receiving space. In the loading space, a movable loading vehicle is arranged which transfers the block storage elements 3 from the port into a block storage element receiving space 2. To do so, the loading vehicle picks up a block storage element 3 from the port in that the loading vehicle lifts the block storage element from below, in the direction of gravity, using a lifting device, as a result of which the block storage element 3 is arranged on the loading vehicle. The loading vehicle, together with the block storage element 3, then moves to a block storage element receiving space 2 into which the block storage element 3 is to be placed into storage. Upon arriving there, the loading vehicle lifts the block storage element upwards against the direction of gravity. If one or more block storage elements 3 are already arranged in the block storage element receiving space 2 that is to be filled, the loading vehicle lifts the block storage element 3 being placed into storage, together with the block storage element 3 arranged above it, and thus forms a block storage element stack. Once the block storage element stack has been lifted above a certain height by the loading vehicle, holding elements, not shown, that hold the block storage element stack move so that the lifting device of the loading vehicle can be lowered again without the block storage element 3. The loading vehicle is then free and can place additional block storage elements 3 into storage or remove them from storage. During a removal-from-storage process, only the bottommost block storage element 3 of a block storage element stack arranged in a block storage element receiving space 2 can be removed in each case. For this purpose, the loading vehicle is positioned below the block storage element 3 being removed and lifts it or the block storage element stack so that the holding element moves into a release position. The loading vehicle then lowers the block storage element stack. Once the block storage element stack has been lowered a certain distance, the holding elements move back into a holding position and hold the remaining block storage element stack in the block storage element receiving space 2. The bottommost block storage element 3 of the block storage element stack is then arranged on the loading vehicle, which transfers the block storage element 3 to the port arrangement (port). From there, the block storage element 3 can be transported further, serviced, repaired, placed back into storage, or the like.

Figure 2:
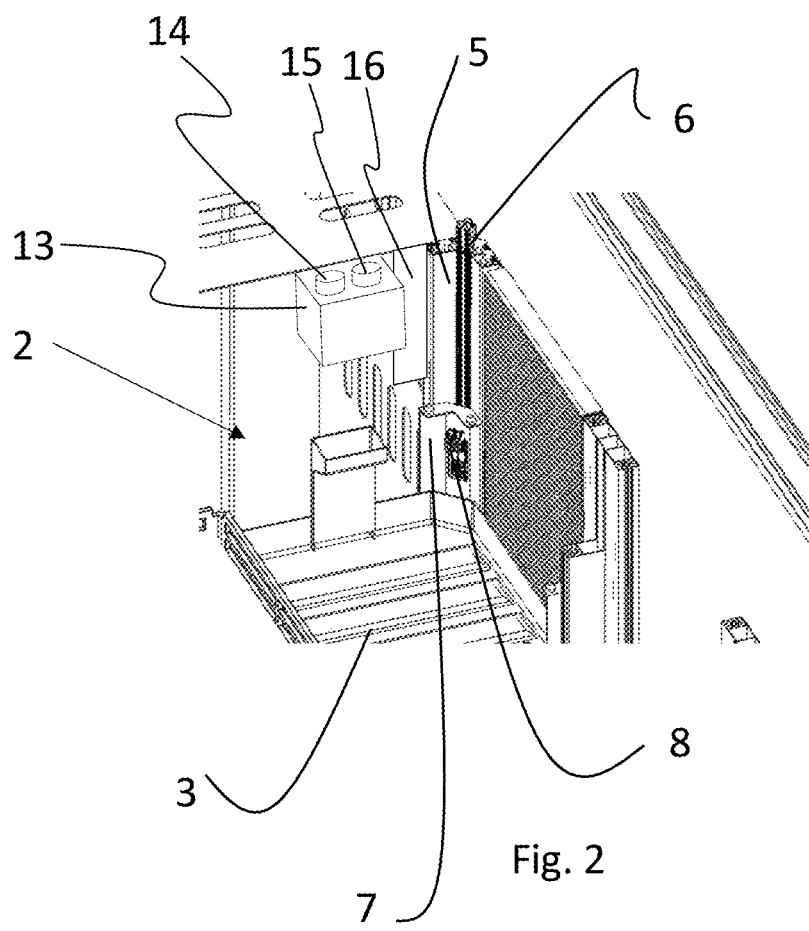
FIG. 2 shows a block storage element receiving space.

In FIG. 2, a block storage element receiving space 2 is illustrated. A block storage element 3 is arranged in the block storage element receiving space 2. Furthermore, the block element receiving space 2 comprises at least one corner guide profile 5 having an integrated conductor rail 6. The block storage element 3 has in the corners thereof a stacking geometry 7 with a counterpart 8. The counterpart 8 thereby interacts with the conductor rail 6 when the block storage element 3 is in a stored state. The stacking geometry 7 is arranged in at least one corner of the block storage element 3 and spaces individual block storage elements 3 from one another in the direction of gravity. In addition, the stacking geometry 7 can comprise a geometric arrangement which prevents a movement of stacked block storage elements 3 relative to one another.

Figure 3:
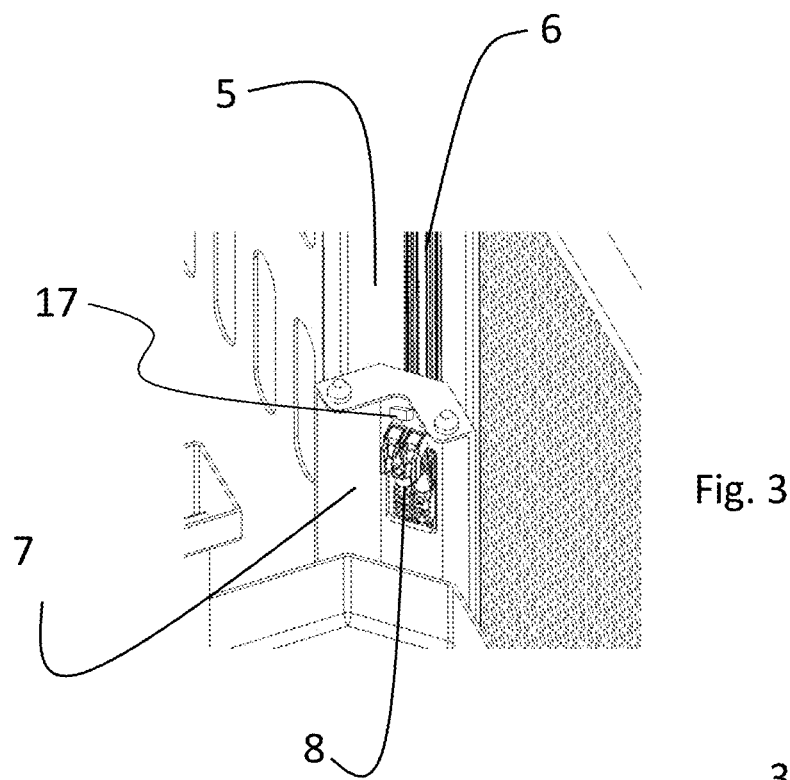
FIG. 3 shows a detailed view of a counterpart and a conductor rail.

In FIG. 3, a detailed view of the corner guide profile 5, the conductor rail 6, the stacking geometry 7, and the counterpart 8 is illustrated. The counterpart 8 can thereby comprise a compensating device, not shown, and a clamping device 17. Furthermore, the counterpart 8 comprises two sliding contacts, not shown, arranged one after the other, which sliding contacts interact with the conductor rail 6 in a stored state. The conductor rail 6 and the counterpart 8 are adapted to one another. As a result, both the conductor rail 6 and also the counterpart can comprise different phases for transmitting current. Depending on how many phases are to be transmitted, the conductor rail 6 and the counterpart can have a two-phase design for one positive pole and one negative pole, or also three phases in a three-phase current transmission.

Figure 4:
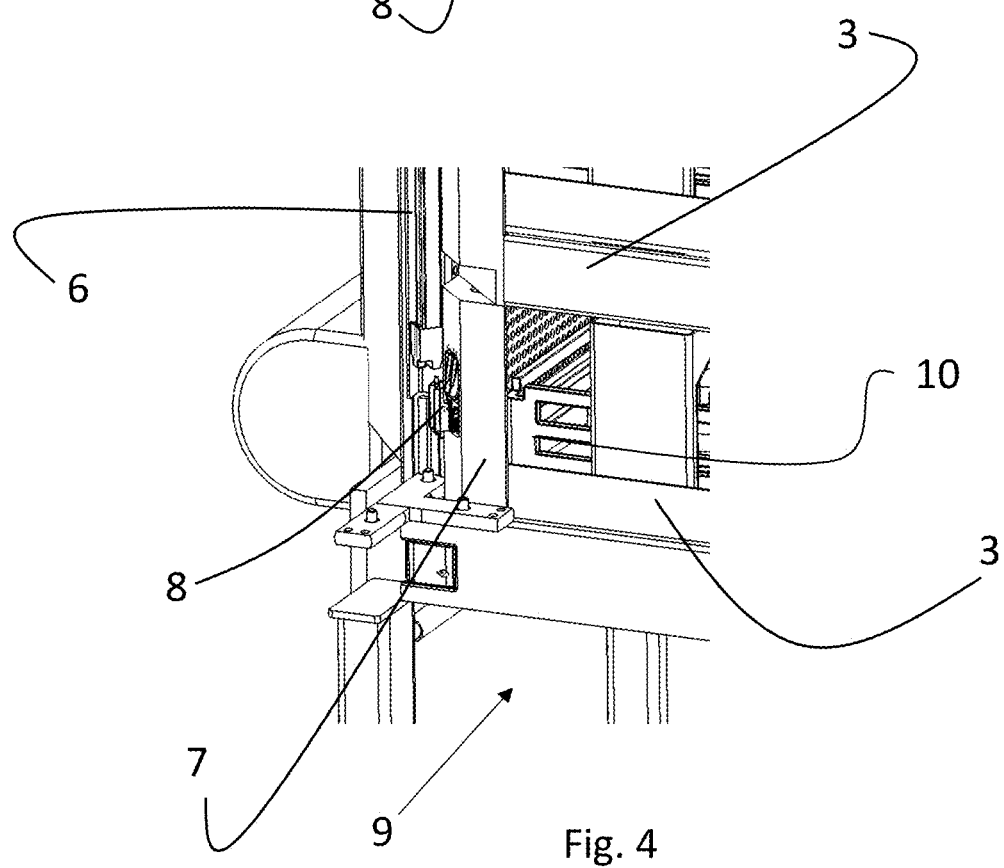
FIG. 4 shows a schematic illustration of a bottommost block storage element receiving position.

FIG. 4 schematically illustrates where the conductor rail 6 is arranged in the block storage element receiving space 2. It can thereby be recognized that the counterpart 8 of the bottom block storage element 3 does not interact with the conductor rail 6. The conductor rail 6 ends above, in the direction of gravity, the bottommost block storage element receiving position. A loading space 9 is arranged below the bottommost block storage element receiving position. Furthermore, one or more planting containers 10 can be arranged in a block storage element 3. Plants in all stages of growth can be arranged in a planting container 10 of this type.

Figure 5:
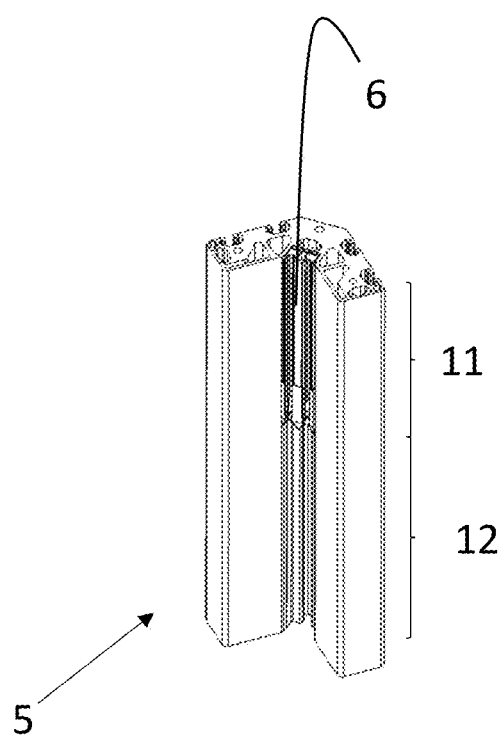
FIG. 5 shows a corner guide profile.

In FIG. 5, a corner guide profile 5 is illustrated with an integrated conductor rail 6. It is thereby clearly discernible that the conductor rail is only arranged in an upper region 11. The upper region 11 is thereby arranged above the bottommost block storage element receiving position. In the lower region 12, which corresponds to the region of the bottommost block storage element receiving position, no conductor rail is arranged.

An exemplary process will be described below in which a block storage element 3 loaded with plants is placed into storage in the block storage system and remains there until the plants are ready for harvesting to then be removed from storage again.

A block storage element 3 is transferred into the placement-into-storage and removal region 4. From the placement-into-storage and removal region 4, the block storage element 3 is transferred into the loading space 9 through the port. Starting from the loading space 9, the block storage element 3 is transferred into the block storage element receiving space 2 from below. Additional block storage elements 3 are placed into storage in the block storage element receiving space 2 accordingly. A block storage element stack forms in the block storage element receiving space 2.

In the transfer of the block storage element 3 from the loading space 9 in the block storage element receiving space 2, the counterpart 8 is inserted into the corner guide profile 5. As soon at the block storage element 3 is transferred from the bottommost block storage element receiving position into a block storage element receiving position located higher up, the counterpart 8 engages in the upper region 11 of the conductor rail 6. The counterpart 8 thus interacts with the conductor rail 6. In an insertion region at a lower end of the conductor rail 6, the conductor rail 6 can comprise an insertion arrangement which facilitates the insertion process of the counterpart 8 into the conductor rail 6. Furthermore, with the compensating device and the clamping device of the counterpart 8, the insertion process can be additionally facilitated.

Once the counterpart 8 is in contact with the conductor rail 6, a lighting apparatus arranged on a bottom side of the block storage element 3 can shine, for example. The block storage element 3 which is arranged in the bottommost block storage element receiving position does not interact with the energy transmission device, as a consequence of which the lighting apparatus on this block storage element cannot provide light. An interruption of the energy supply to the bottommost block storage element 3 is no longer necessary, whereby open- and closed-loop control expenditure is reduced.

With reference to FIG. 2, a supply apparatus 13 that can deliver fluid and/or nutrients to the plants, a human intervention during the growth process of the plants becomes unnecessary. A fluid device 14 and/or a nutrient supply device 15 of this type can furthermore comprise the following elements: at least one valve and/or at least one storage tank and/or at least one pump and/or at least one feed and/or at least one outflow and/or at least one processing device. With these elements, the fluid device 14 and/or nutrient supply device 15 can be adapted to the greenhouse arrangement. Through supply apparatus 13, the plants can be adequately supplied with light, fluid, nutrient solutions, an appropriate atmosphere, or the like in accordance with their needs. Further, a data transmission device 16 can be provided, from which data from sensors, valves, switches, or the like can be transmitted, for example. The data can be used by the supply apparatus 13 to help optimize plant growth. The fluid and/or the nutrient can also be used again by the processing device.

Additionally, the greenhouse arrangement can comprise a climate control system that enables optimal climatic conditions for the plants. Growth of the plants can thus be accelerated or slowed, for example. The climatic conditions include for example air temperature, $CO_2$ content of the air, humidity, or the like.

The block storage elements 3 remain in the block storage system 1 until the plants are ready for harvesting or ready for transplanting. To remove block storage elements 3 from storage out of the block storage system 1, the bottommost block storage element 3 of a block storage element stack is respectively transferred out of a block storage element receiving space 2 in the loading space 9. From the loading space 9, the block storage element 3 is transferred into the placement-into-storage and removal region through the port. In the placement-into-storage and receiving region, the plants that are ready for harvesting can be removed from the block storage element 3 and the block storage element can be loaded with new plants or seeds before the block storage element 3 is placed into storage again. As an alternative to the return to storage of the block storage element 3, the block storage element 3 can be serviced or cleaned.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS

1 Block storage system
2 Block storage element receiving space
3 Block storage element
4 Placement-into-storage and receiving region
5 Corner guide profile
6 Conductor rail
7 Stacking geometry
8 Counterpart
9 Loading space
10 Planting container
11 Upper region
12 Lower region

What is claimed:

1. A greenhouse arrangement comprising:
  block storage elements;
  a block storage system comprising at least one block storage element receiving space comprising at least one corner area and a loading space located one of above or below the at least one block storage element receiving space,
  wherein the block storage elements are placed into or removed from the at least one block storage element receiving space through the loading space in a direction of gravity or against a direction of gravity and the block storage elements are stackable within the at least one block storage element receiving space in order to form at least one vertical block storage element stack,
  wherein the block storage elements include stacking geometries that are structured to separate individual block storage elements in the at least one vertical block storage element stack in the direction of gravity, and
  wherein each block element receiving space comprises at least one corner guide profile that is arranged in the at least one corner area to guide a corner of one of the block storage elements in or against the direction of gravity and that includes an integrated conductor rail extending along the direction of gravity, and
  wherein the stacking geometries comprise a counterpart element for sliding engagement along the integrated conductor rail.

2. The greenhouse arrangement according to claim 1, wherein plants are arranged in the block storage elements, and
  wherein the integrated conductor rail is configured as a part of at least one of at least one supply apparatus or at least one data transmission device.

3. The greenhouse arrangement according to claim 2, wherein the loading space is arranged below the block storage element receiving space.

4. The greenhouse arrangement according to claim 1, wherein at least one block storage element comprises a lighting apparatus.

5. The greenhouse arrangement according to claim 2, wherein the integrated conductor rail is arranged along at least one of a placement-into-storage and/or removal direction.

6. The greenhouse arrangement according to claim 2, wherein the at least one block storage element receiving space comprises a bottommost block storage element receiving position and at least one other block storage element receiving position arranged thereabove, and
wherein starting from an uppermost block storage element receiving position, the integrated conductor rail ends above the bottommost block storage element receiving position.

7. The greenhouse arrangement according to claim 2, wherein the at least one supply apparatus comprises multiple supply devices and the at least one data transmission device comprises multiple data transmission devices,
wherein the block storage receiving space is configured with at least a first and second corner, and
wherein the multiple supply apparatuses are arranged in the first corner and/or the multiple data transmission devices are arranged in the second corner.

8. The greenhouse arrangement according to claim 2, wherein the at least one supply apparatus comprises an energy transmission device supplying energy to energy consumers.

9. The greenhouse arrangement according to claim 8, wherein the counterpart element engages at least one of the energy transmission device and/or data transmission device via the conductor rail.

10. The greenhouse arrangement according to claim 9, wherein the counterpart element comprises at least a sliding contact.

11. The greenhouse arrangement according to claim 10, wherein the sliding contact is clamped against the at least one of the energy transmission device or data transmission device.

12. The greenhouse arrangement according to claim 10, wherein the sliding contact engages the at least one of the energy transmission device or data transmission device.

13. The greenhouse arrangement according to claim 10, wherein the at least a sliding contact comprises at least two sliding contacts arranged one after the other.

14. The greenhouse arrangement according to claim 2, wherein the supply apparatus comprises at least one of a fluid supply device or a nutrient supply device.

15. The greenhouse apparatus according to claim 14, wherein the at least one of the fluid supply device or the nutrient supply device comprises at least one of:
at least one valve, at least one storage tank, at least one pump, at least one feed, or at least one outflow, or at least one processing device.

16. The greenhouse arrangement according to claim 1, wherein the at least one block storage element receiving space comprises plural block storage element receiving spaces arranged to form plural parallel vertical block storage element stacks.

* * * * *